United States Patent
Chiang

(10) Patent No.: US 7,966,433 B2
(45) Date of Patent: Jun. 21, 2011

(54) METHOD FOR ENHANCING PERFORMANCE OF DATA ACCESS BETWEEN A PERSONAL COMPUTER AND A USB MASS STORAGE, ASSOCIATED PERSONAL COMPUTER, AND STORAGE MEDIUM STORING AN ASSOCIATED USB MASS STORAGE DRIVER

(75) Inventor: Chang-Hao Chiang, Hsinchu (TW)

(73) Assignees: Silicon Motion Inc., Tianan Digital, Futian, Shenzhen, Guangdong (CN); Silicon Motion Inc., Jhubei, Hsinchu County (TW)

( * ) Notice: Subject to any disclaimer, the term of this patent is extended or adjusted under 35 U.S.C. 154(b) by 188 days.

(21) Appl. No.: 12/553,993

(22) Filed: Sep. 4, 2009

(65) Prior Publication Data
US 2011/0060858 A1   Mar. 10, 2011

(51) Int. Cl.
*G06F 3/00*   (2006.01)
(52) U.S. Cl. .................. 710/29; 710/5; 710/36; 719/321
(58) Field of Classification Search ........................ None
See application file for complete search history.

(56) References Cited

U.S. PATENT DOCUMENTS
6,915,368 B2 *  7/2005  Lin ................................ 710/302
2005/0120170 A1 *  6/2005  Zhu ................................ 711/114
* cited by examiner

*Primary Examiner* — Alan Chen
(74) *Attorney, Agent, or Firm* — Winston Hsu; Scott Margo

(57) ABSTRACT

A method for enhancing performance of data access between a personal computer and a USB Mass Storage is provided. The personal computer is equipped with a plurality of layers of drivers regarding USB data access, and a lower layer of the layers of the drivers includes a USB Bus Driver. The method includes: monitoring commands sent from an operating system (OS) file system to an upper layer; and when a command sent from the OS file system to the upper layer is utilized for accessing data of a data amount that is greater than a predetermined threshold value, omitting a portion of a plurality of IRPs, automatically generating a plurality of replies for replying to the omitted IRPs, and altering at least one IRP of remaining IRPs in order to correctly access the data with a lower IRP count, wherein the plurality of IRPs is associated with the command.

21 Claims, 5 Drawing Sheets

METHOD FOR ENHANCING PERFORMANCE OF DATA ACCESS BETWEEN A PERSONAL COMPUTER AND A USB MASS STORAGE, ASSOCIATED PERSONAL COMPUTER, AND STORAGE MEDIUM STORING AN ASSOCIATED USB MASS STORAGE DRIVER

BACKGROUND OF THE INVENTION

1. Field of the Invention

The present invention relates to Universal Serial Bus (USB) Mass Storage control, and more particularly, to a method for enhancing performance of data access between a personal computer and a USB Mass Storage, an associated personal computer, and a storage medium storing an associated USB Mass Storage driver.

2. Description of the Prior Art

When a USB Mass Storage such as a USB flash drive or a USB flash disk is electronically connected to a host device such as a personal computer, the host device typically controls the USB Mass Storage with some drivers originally bundled with or provided by an operating system (OS) of the host device. According to the related art, data access between the host device and the USB Mass Storage should comply with some USB storage transmission specifications. More particularly, in a situation where the host device accesses the USB Mass Storage with a command instructing a data amount that is greater than 64 kilobytes, for example, the data amount is equal to one megabytes, a driver of an upper layer first generates 16 input/output request packages (IO request packages, IRPs), and a driver of an intermediate layer then generates 48 IRPs correspondingly, and then the data to be accessed is divided into 16 portions to be carried by 16 IRPs out of the 48 IRPs with each portion having 64 kilobytes. Therefore, the above operations cause unnecessary waste of a user's time.

In a situation where the data amount is much greater than that mentioned above, the unnecessary waste of the user's time is really an issue since the user may feel annoyed. Thus, a novel method is required for enhancing performance of data access between the host device and the USB Mass Storage.

SUMMARY OF THE INVENTION

It is therefore an objective of the claimed invention to provide a method for enhancing performance of data access between a personal computer and a Universal Serial Bus (USB) Mass Storage, to provide an associated personal computer, and to provide a storage medium storing an associated USB Mass Storage driver, in order to solve the above-mentioned problem.

According to one embodiment of the claimed invention, a method for enhancing performance of data access between a personal computer and a USB Mass Storage is provided. The personal computer is equipped with a plurality of layers of drivers regarding USB data access, and a lower layer of the layers of the drivers comprises a USB Bus Driver. The method comprises: monitoring commands sent from an operating system (OS) file system of an OS of the personal computer to an upper layer of the layers of the drivers; and when a command sent from the OS file system to the upper layer is utilized for accessing data of a data amount that is greater than a predetermined threshold value, omitting a portion of a plurality of input/output request packages (IO request packages, IRPs) that are sent between at least two layers of the layers of the drivers, automatically generating a plurality of replies for replying to the omitted IRPs, and altering at least one IRP of remaining IRPs of the command in order to correctly access the data with a lower IRP count, wherein the plurality of IRPs is associated with the command.

According to an embodiment of the present invention, an associated personal computer is further provided. The personal computer comprises a storage medium storing a USB Mass Storage driver for enhancing performance of data access between the personal computer and a USB Mass Storage, the personal computer is equipped with a plurality of layers of drivers regarding USB data access, and a lower layer of the layers of the drivers comprises a USB Bus Driver. In addition, the USB Mass Storage is electrically connected to a USB port of the personal computer. When the USB Mass Storage driver is executed by the personal computer, the personal computer operates according to a method comprising: monitoring commands sent from an OS file system of an OS of the personal computer to an upper layer of the layers of the drivers; and when a command sent from the OS file system to the upper layer is utilized for accessing data of a data amount that is greater than a predetermined threshold value, omitting a portion of a plurality of IRPs that are sent between at least two layers of the layers of the drivers, automatically generating a plurality of replies for replying to the omitted IRPs, and altering at least one IRP of remaining IRPs of the command in order to correctly access the data with a lower IRP count, wherein the plurality of IRPs is associated with the command.

In addition, a storage medium storing an associated USB Mass Storage driver is provided accordingly. The USB Mass Storage driver is utilized for enhancing performance of data access between a personal computer and a USB Mass Storage, the personal computer is equipped with a plurality of layers of drivers regarding USB data access, and a lower layer of the layers of the drivers comprises a USB Bus Driver. In addition, the USB Mass Storage is electrically connected to a USB port of the personal computer. When the USB Mass Storage driver is executed by the personal computer, the personal computer operates according to a method comprising: monitoring commands sent from an OS file system of an OS of the personal computer to an upper layer of the layers of the drivers; and when a command sent from the OS file system to the upper layer is utilized for accessing data of a data amount that is greater than a predetermined threshold value, omitting a portion of a plurality of IRPs that are sent between at least two layers of the layers of the drivers, automatically generating a plurality of replies for replying to the omitted IRPs, and altering at least one IRP of remaining IRPs of the command in order to correctly access the data with a lower IRP count, wherein the plurality of IRPs is associated with the command.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
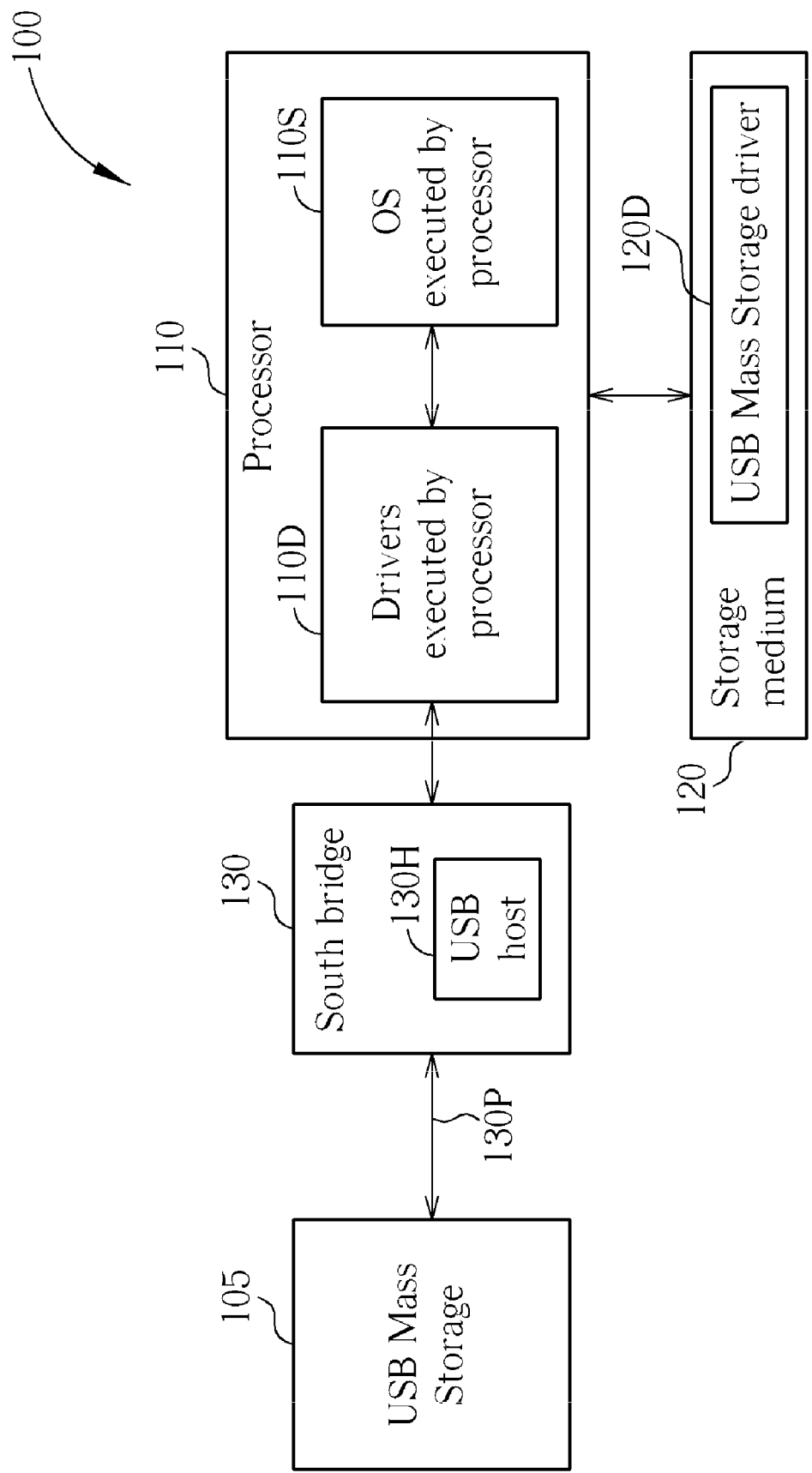
FIG. 1 is a diagram of a personal computer according to a first embodiment of the present invention.

FIG. 1 is a diagram of a personal computer 100 according to a first embodiment of the present invention. For example, the personal computer 100 is a laptop computer. In another example, the personal computer 100 is a desktop computer. As shown in FIG. 1, the personal computer 100 comprises a processor 110, a storage medium 120, a south bridge 130 comprising at least one Universal Serial Bus (USB) host 130H, and a USB Mass Storage 105 electronically connected to a USB port 130P, where the USB Mass Storage of this embodiment can be a Solid State Drive (SSD) or a card reader. This is for illustrative purposes only, and is not meant to be a limitation of the present invention. According to a variation of this embodiment, the USB Mass Storage can be detached from the personal computer 100, where the USB Mass Storage 105 of this variation can be a USB flash disk. According to other embodiments, the USB Mass Storage can be a hard disk, a compact disc drive or any other USB Mass Storage.

According to this embodiment, the storage medium 120 stores a USB Mass Storage driver 120D for enhancing performance of data access between the personal computer 100 and the USB Mass Storage 105. The notation 110D is utilized for representing drivers executed by the personal computer 100, and more particularly, by the processor 110, where the drivers 110D comprises the USB Mass Storage driver 120D read from the storage medium 120. In addition, the notation 110S is utilized for representing an operating system (OS) executed by the personal computer 100, and more particularly, by the processor 110.

According to this embodiment, the storage medium 120 represents a hard disk (HD). This is for illustrative purposes only, and is not meant to be a limitation of the present invention. According to a variation of this embodiment, the storage medium 120 represents an optical disc accessed by an optical disc drive of the personal computer 100 of this variation. For example, the optical disc can be a Compact Disc-Read Only Memory (CD-ROM) or a CD-Recordable (CD-R). In another example, the optical disc can be a Digital Versatile Disc (DVD) such as a DVD-ROM, a DVD-Recordable (DVD-R) disc, or a DVD-R disc.

According to another variation of this embodiment, the storage medium 120 represents a non-volatile (NV) memory. For example, the storage medium 120 can be a Basic Input Output System (BIOS) ROM. According to another variation of this embodiment, the storage medium 120 represents a non-volatile (NV) memory accessed by an associated interface circuit of the personal computer 100 of this variation. For example, the interface circuit is an SDD, and the storage medium 120 is a Flash memory of the SDD. According to another variation of this embodiment, the USB Mass Storage driver 120D can be stored in a storage medium of a portable storage device such as a memory card or a USB flash disk, where the storage medium of this variation is a Flash memory.

Figure 2:
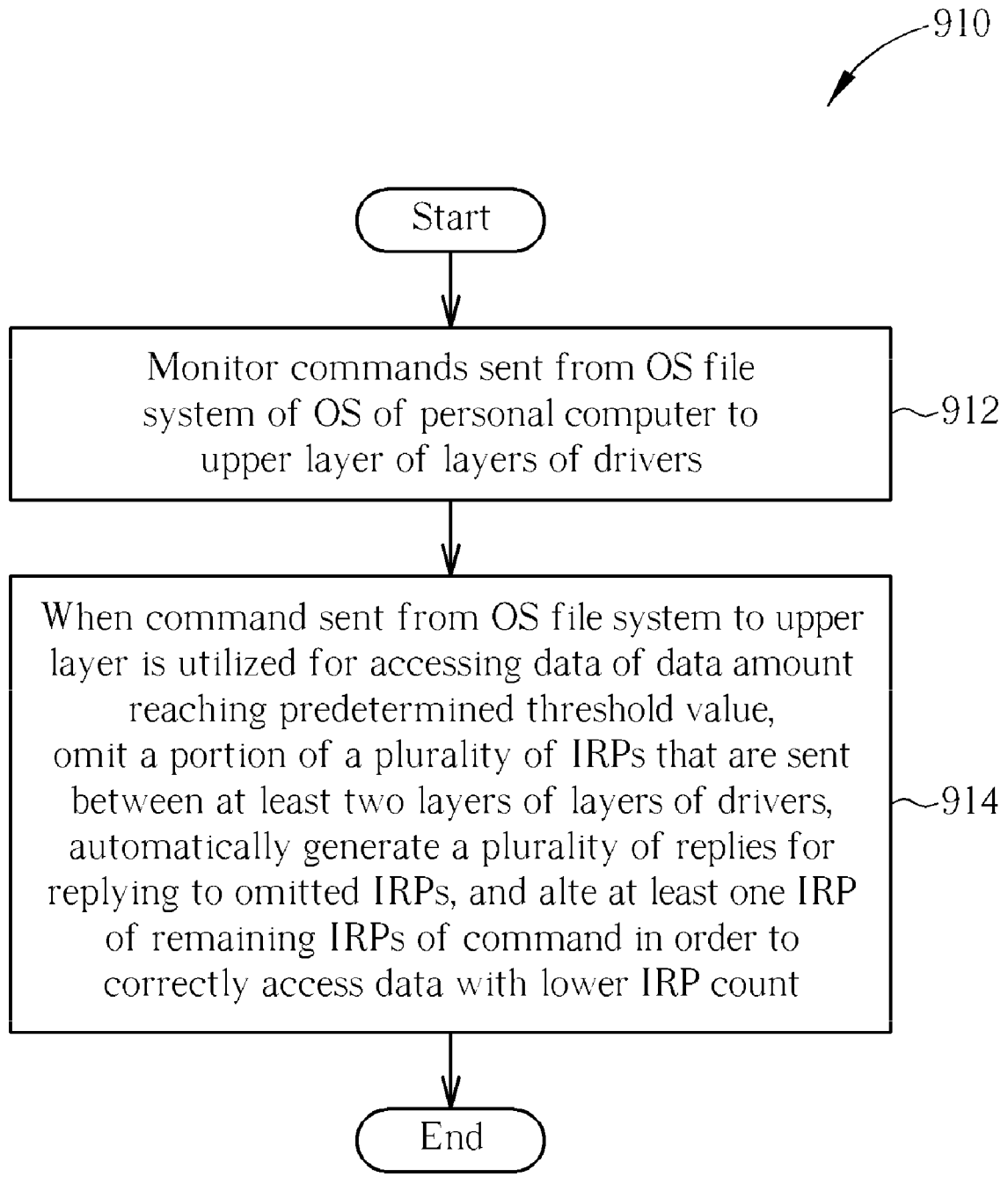
FIG. 2 illustrates a flowchart of a method for enhancing performance of data access between a personal computer and a Universal Serial Bus (USB) Mass Storage according to an embodiment of the present invention.

FIG. 2 illustrates a flowchart of a method 910 for enhancing performance of data access between a personal computer and a Universal Serial Bus (USB) Mass Storage according to an embodiment of the present invention, where the personal computer is equipped with a plurality of layers of drivers regarding USB data access, and a lower layer of the layers of the drivers comprises a USB Bus Driver. The method 910 shown in FIG. 2 can be applied to the personal computer 100 shown in FIG. 1. In addition, the method 910 shown in FIG. 2 can be implemented by utilizing the personal computer 100 shown in FIG. 1. More particularly, when the USB Mass Storage driver 120D is executed by the personal computer 100, the personal computer 100 operates according to the method 910 shown in FIG. 2, where the method 910 is described as follows.

In Step 912, the USB Mass Storage driver 120D executed by the processor 110 monitors commands sent from an OS file system of the OS 110S of the personal computer 100 to an upper layer of the layers of the drivers.

In Step 914, when a command sent from the OS file system to the upper layer is utilized for accessing data of a data amount that is greater than a predetermined threshold value, the USB Mass Storage driver 120D executed by the processor 110 is arranged to omit a portion of a plurality of input/output request packages (IO request packages, IRPs) that are sent between at least two layers of the layers of the drivers, automatically generate a plurality of replies for replying to the omitted IRPs, and alter at least one IRP of the remaining IRPs of the command in order to correctly access the data with a lower IRP count, where the plurality of IRPs is associated with the command.

In practice, the predetermined threshold value represents a data amount that is equal to 64 kilobytes. However, this is for illustrative purposes only, and is not meant to be a limitation of the present invention. According to a variation of this embodiment, the predetermined threshold value represents a data amount that can be less than 64 kilobytes or be greater than 64 kilobytes.

Figure 3:
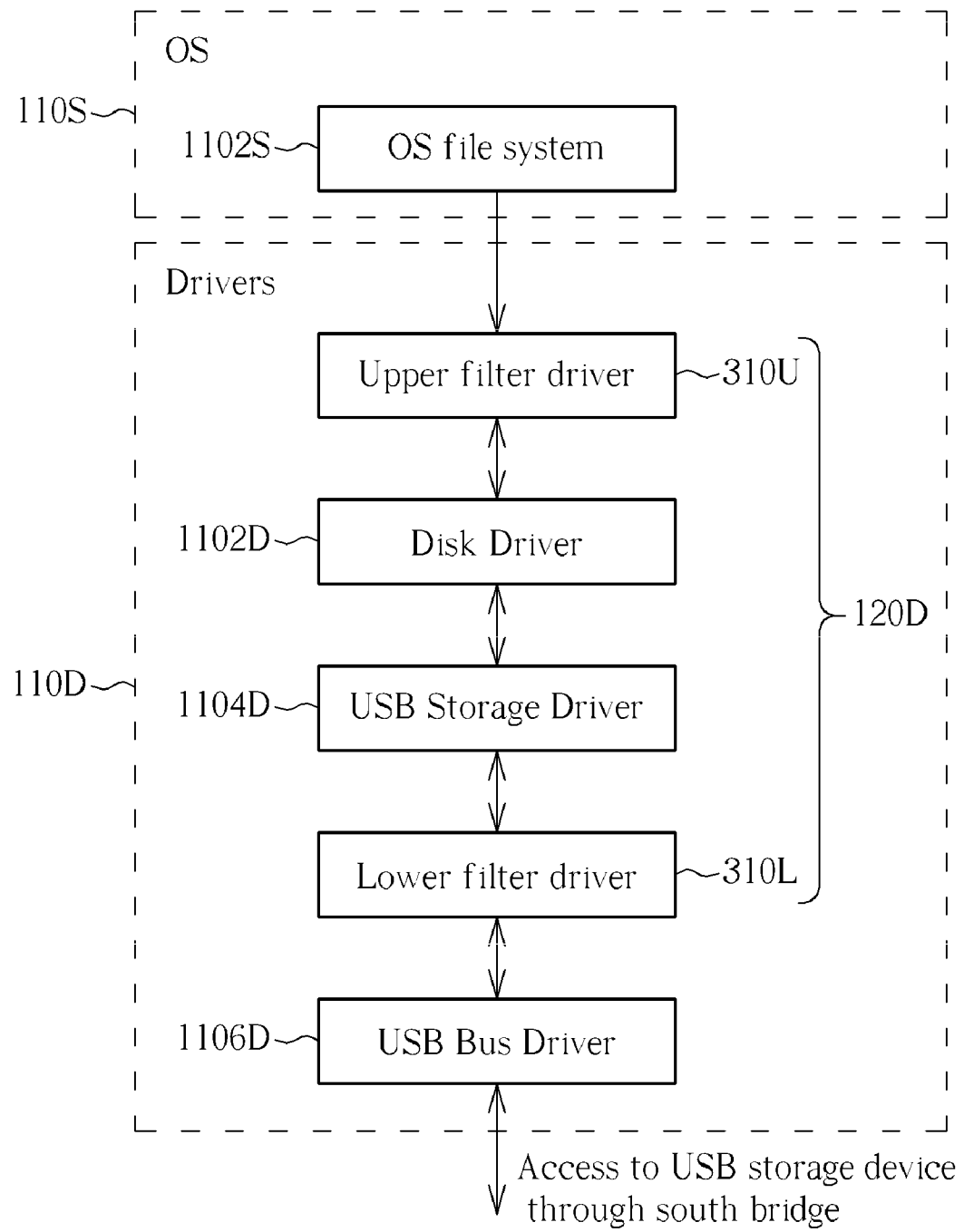
FIG. 3 illustrates a plurality of layers of drivers regarding USB data access according to an embodiment of the present invention, where an upper filter driver and a lower filter driver of a USB Mass Storage driver implemented according to the method shown in FIG. 2 are logically inserted between or above some layers of the plurality of layers of drivers.

FIG. 3 illustrates a plurality of layers of drivers regarding USB data access according to an embodiment of the present invention, where an upper filter driver 310U and a lower filter driver 310L of the USB Mass Storage driver 120D implemented according to the method 910 shown in FIG. 2 are logically inserted between or above some layers of the plurality of layers of drivers.

According to this embodiment, the upper layer of the layers comprises a Disk Driver 1102D, and an intermediate layer of the layers of the drivers comprises a USB Storage Driver 1104D, where the notation 1106D represents the USB Bus Driver mentioned above, and the notation 1102S represents the OS file system mentioned above. In addition, the IRPs that are sent between the at least two layers comprise IRPs sent between the upper layer and the intermediate layer. More particularly, the IRPs that are sent between the at least two layers further comprise IRPs sent between the intermediate layer and the lower layer. This is for illustrative purposes only, and is not meant to be a limitation of the present invention. According to a variation of this embodiment, the IRPs that are sent between the at least two layers comprise IRPs sent between the intermediate layer and the lower layer, no IRP sent between the upper layer and the intermediate layer are omitted.

Figure 4:
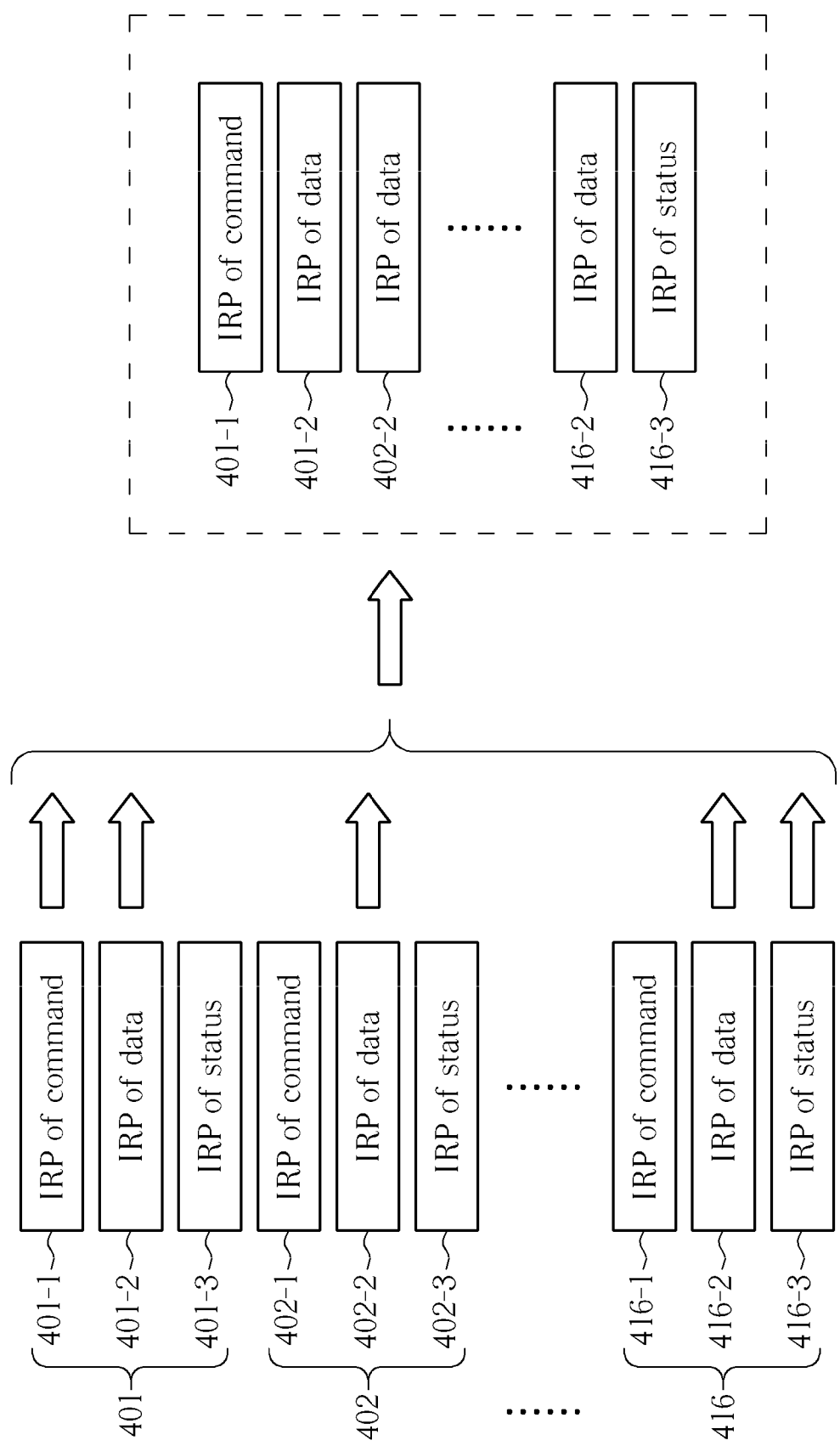
FIG. 4 illustrates some implementation details regarding omitting a portion of a plurality of input/output request packages (IO request packages, IRPs) according to the embodiment shown in FIG. 3.

FIG. 4 illustrates some implementation details regarding omitting a portion of a plurality of IRPs according to the embodiment shown in FIG. 3. In one embodiment, the personal computer 100 accesses the USB Mass Storage 105 with a command instructing a data amount that is equal to one megabyte. The upper filter driver 310U detects that the data amount is reaching and greater than a predetermined threshold value (e.g. 64 kilobytes) and instructs the associated driver (e.g. the lower filter driver 310L) to response correspondingly. Please note that the order of the upper filter driver 310U and the lower filter driver 310L in the USB Mass Storage driver 120D can be changed as requirement. The driver of the upper layer first generates 16 IRPs, and the driver of the intermediate layer then generates 48 IRPs correspondingly, such as the 16 sets of IRPs 401, 402, ..., and 406, each set of which comprises an IRP of command, an IRP of data, and an IRP of status (e.g. {401-1, 401-2, 401-3}, {402-1, 402-2, 402-3}, ..., and {416-1, 416-2, 416-3}). In addition, the data to be accessed is divided into 16 portions to be carried by 16 IRPs 402-1, 402-2, ..., and 416-2 out of the 48 IRPs, where each portion may reach a maximal data amount of 64 kilobytes.

As shown in FIG. 4, the USB Mass Storage driver 120D executed by the processor 110 is arranged to omit the IRPs {401-3, 402-1}, {402-3, 403-1}, ..., and {415-3, 416-1}, and automatically generate the replies for replying to the omitted IRPs {401-3, 402-1}, {402-3, 403-1}, ..., and {415-3, 416-1}. In one embodiment, the lower filter driver 310L executed by the processor 110 omits the IRPs {401-3, 402-1}, {402-3, 403-1}, ..., and {415-3, 416-1}, and automatically generates the replies for replying to the omitted IRPs {401-3, 402-1}, {402-3, 403-1}, ..., and {415-3, 416-1}. In addition, the USB Mass Storage driver 120D executed by the processor 110 alters at least one IRP of the remaining IRPs 401-1, {401-2, 402-2, ..., 416-2}, and 416-3, in order to correctly access the data with a lower IRP count. More particularly, the USB Mass Storage driver 120D executed by the processor 110 alters a field within a header of the IRP 401-1, where the altered field is utilized for indicating the data amount of at least a portion of the remaining IRPs, such as a portion of the remaining IRPs or all of the remaining IRPs. In one embodiment, the lower filter driver 310L executed by the processor 110 alters a field within a header of the IRP 401-1. Since lots of IRPs are omitted, the handshake mechanisms accompanied by the IRPs can also be omitted. As a result, the performance of data access to the USB Mass Storage 105 can be enhanced.

Figure 5:
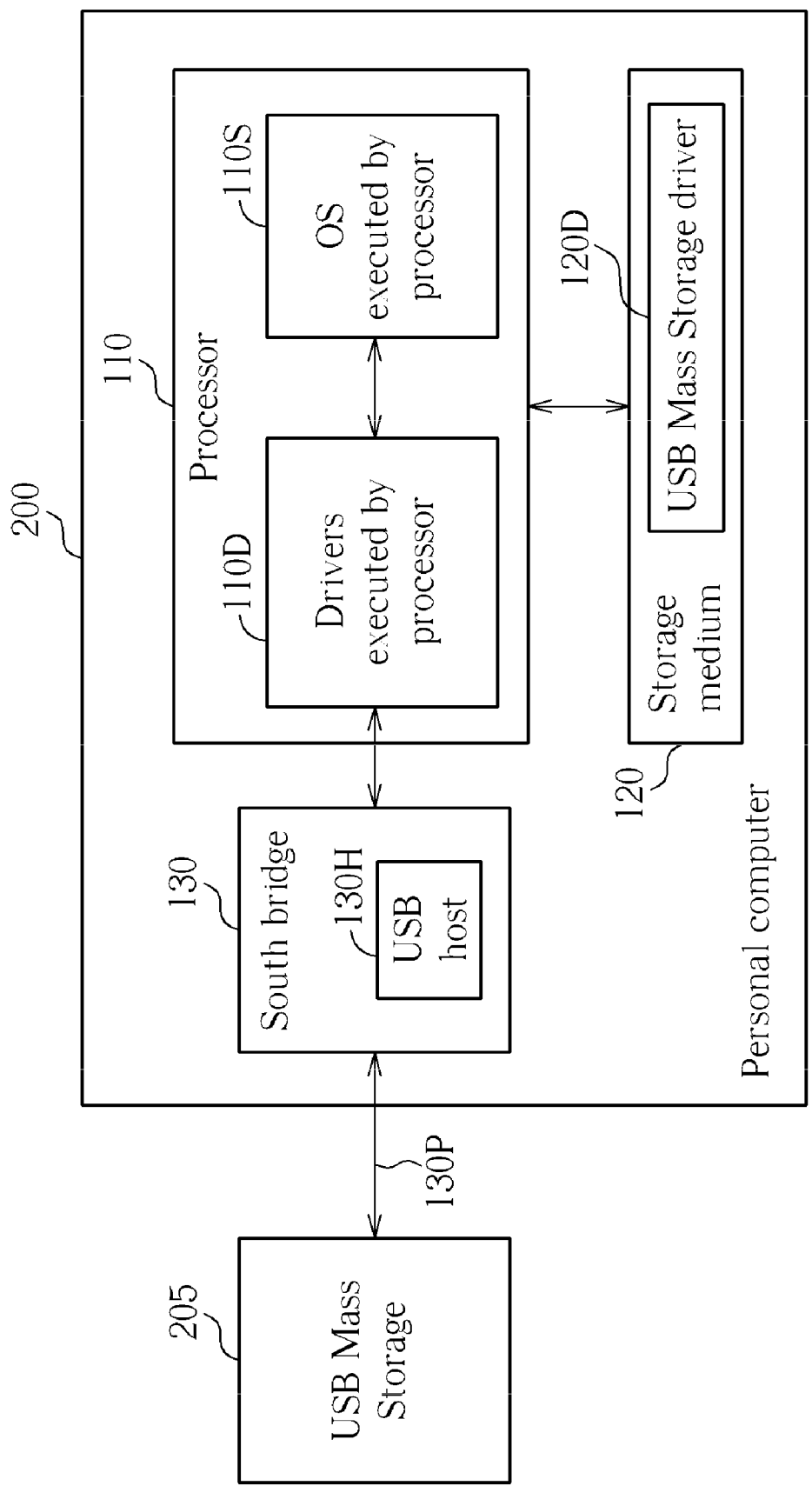
FIG. 5 is a diagram of a personal computer according to a second embodiment of the present invention, where the second embodiment is a variation of the first embodiment.

FIG. 5 is a diagram of a personal computer 200 according to a second embodiment of the present invention, where the second embodiment is a variation of the first embodiment.

Here, the aforementioned USB Mass Storage 105 is replaced by another USB Mass Storage 205 that is positioned outside the personal computer 200, where the user can detach the USB Mass Storage 205 from the USB port 130P of the personal computer 200 when needed. Similar descriptions are not repeated for this embodiment.

Those skilled in the art will readily observe that numerous modifications and alterations of the device and method may be made while retaining the teachings of the invention.

What is claimed is:

1. A method for enhancing performance of data access between a personal computer and a Universal Serial Bus (USB) Mass Storage, the personal computer being equipped with a plurality of layers of drivers regarding USB data access, a lower layer of the layers of the drivers comprising a USB Bus Driver, the method comprising:
monitoring commands sent from an operating system (OS) file system of an OS of the personal computer to an upper layer of the layers of the drivers; and
when a command sent from the OS file system to the upper layer is utilized for accessing data of a data amount that is greater than a predetermined threshold value, omitting a portion of a plurality of input/output request packages (IO request packages, IRPs) that are sent between at least two layers of the layers of the drivers, automatically generating a plurality of replies for replying to the omitted IRPs, and altering at least one IRP of remaining IRPs of the command in order to correctly access the data with a lower IRP count, wherein the plurality of IRPs is associated with the command.

2. The method of claim 1, wherein the upper layer of the layers comprises a Disk Driver, and an intermediate layer of the layers of the drivers comprises a USB Storage Driver.

3. The method of claim 2, wherein the IRPs that are sent between the at least two layers comprise IRPs sent between the upper layer and the intermediate layer.

4. The method of claim 3, wherein the IRPs that are sent between the at least two layers further comprise IRPs sent between the intermediate layer and the lower layer.

5. The method of claim 2, wherein the IRPs that are sent between the at least two layers comprise IRPs sent between the intermediate layer and the lower layer.

6. The method of claim 1, wherein the step of altering the at least one IRP of the remaining IRPs of the command further comprises:
altering a field within a header of the IRP, wherein the altered field is utilized for indicating a data amount of at least a portion of the remaining IRPs.

7. The method of claim 1, wherein a predetermined threshold value represents a data amount that is equal to or less than 64 kilobytes.

8. A personal computer, which comprises a storage medium storing a Universal Serial Bus (USB) Mass Storage driver for enhancing performance of data access between the personal computer and a USB Mass Storage, the personal computer being equipped with a plurality of layers of drivers regarding USB data access, a lower layer of the layers of the drivers comprising a USB Bus Driver, the USB Mass Storage being electrically connected to a USB port of the personal computer, wherein when the USB Mass Storage driver is executed by the personal computer, the personal computer operates according to a method comprising:
monitoring commands sent from an operating system (OS) file system of an OS of the personal computer to an upper layer of the layers of the drivers; and
when a command sent from the OS file system to the upper layer is utilized for accessing data of a data amount that is greater than a predetermined threshold value, omitting a portion of a plurality of input/output request packages (IO request packages, IRPs) that are sent between at least two layers of the layers of the drivers, automatically generating a plurality of replies for replying to the omitted IRPs, and altering at least one IRP of remaining IRPs of the command in order to correctly access the data with a lower IRP count, wherein the plurality of IRPs is associated with the command.

9. The personal computer of claim 8, wherein the upper layer of the layers comprises a Disk Driver, and an intermediate layer of the layers of the drivers comprises a USB Storage Driver.

10. The personal computer of claim 9, wherein the IRPs that are sent between the at least two layers comprise IRPs sent between the upper layer and the intermediate layer.

11. The personal computer of claim 10, wherein the IRPs that are sent between the at least two layers further comprise IRPs sent between the intermediate layer and the lower layer.

12. The personal computer of claim 9, wherein the IRPs that are sent between the at least two layers comprise IRPs sent between the intermediate layer and the lower layer.

13. The personal computer of claim 8, wherein the step of altering the at least one IRP of the remaining IRPs of the command further comprises:

a field within a header of the IRP, wherein the altered field is utilized for indicating a data amount of at least a portion of the remaining IRPs.

14. The personal computer of claim 8, wherein a predetermined threshold value represents a data amount that is equal to or less than 64 kilobytes.

15. A storage medium storing a Universal Serial Bus (USB) Mass Storage driver for enhancing performance of data access between a personal computer and a USB Mass Storage, the personal computer being equipped with a plurality of layers of drivers regarding USB data access, a lower layer of the layers of the drivers comprising a USB Bus Driver, the USB Mass Storage being electrically connected to a USB port of the personal computer, wherein when the USB Mass Storage driver is executed by the personal computer, the personal computer operates according to a method comprising:

monitoring commands sent from an operating system (OS) file system of an OS of the personal computer to an upper layer of the layers of the drivers; and when a command sent from the OS file system to the upper layer is utilized for accessing data of a data amount reaching a predetermined threshold value, omitting a portion of a plurality of input/output request packages (IO request packages, IRPs) that are sent between at least two layers of the layers of the drivers, automatically generating a plurality of replies for replying to the omitted IRPs, and altering at least one IRP of remaining IRPs of the command in order to correctly access the data with a lower IRP count, wherein the plurality of IRPs is associated with the command.

16. The storage medium of claim 15, wherein the upper layer of the layers comprises a Disk Driver, and an intermediate layer of the layers of the drivers comprises a USB Storage Driver.

17. The storage medium of claim 16, wherein the IRPs that are sent between the at least two layers comprise IRPs sent between the upper layer and the intermediate layer.

18. The storage medium of claim 17, wherein the IRPs that are sent between the at least two layers further comprise IRPs sent between the intermediate layer and the lower layer.

19. The storage medium of claim 16, wherein the IRPs that are sent between the at least two layers comprise IRPs sent between the intermediate layer and the lower layer.

20. The storage medium of claim 15, wherein the step of altering the at least one IRP of the remaining IRPs of the command further comprises:

altering a field within a header of the IRP, wherein the altered field is utilized for indicating a data amount of at least a portion of the remaining IRPs.

21. The storage medium of claim 15, wherein a predetermined threshold value represents a data amount that is equal to or less than 64 kilobytes.

* * * * *